(12) United States Patent
Pagano et al.

(10) Patent No.: US 8,273,162 B2
(45) Date of Patent: Sep. 25, 2012

(54) WASTEWATER PLUMBING VENT GAS ADSORPTION FILTER

(76) Inventors: Louis John Pagano, West Milford, NJ (US); Mark Steven Russo, Northvale, NJ (US); Anthony J. Prisco, Jr., Cinnaminson, NJ (US)

( * ) Notice: Subject to any disclaimer, the term of this patent is extended or adjusted under 35 U.S.C. 154(b) by 389 days.

(21) Appl. No.: 12/592,102

(22) Filed: Nov. 19, 2009

(65) Prior Publication Data

US 2010/0101986 A1    Apr. 29, 2010

Related U.S. Application Data

(63) Continuation-in-part of application No. 12/348,296, filed on Jan. 4, 2009, now abandoned.

(51) Int. Cl.
*B01D 53/04*    (2006.01)

(52) U.S. Cl. .................. 96/108; 454/242; 4/218

(58) Field of Classification Search ............. 96/108; 55/385.4; 454/32, 242, 250; 4/218–221, 4/347–352
See application file for complete search history.

(56) References Cited

U.S. PATENT DOCUMENTS

| | | | | |
|---|---|---|---|---|
| 1,654,925 A * | 1/1928 | Drager | ............ | 252/192 |
| 1,784,067 A * | 12/1930 | Holtson | ............ | 55/484 |
| 2,545,755 A | 3/1951 | Ward | | |
| 3,086,549 A * | 4/1963 | Fino | ............ | 137/493 |
| 3,503,659 A * | 3/1970 | Boylan | ............ | 384/416 |
| 3,939,506 A | 2/1976 | Pearson | | |
| 3,941,573 A * | 3/1976 | Chapel | ............ | 96/135 |
| 4,325,290 A | 4/1982 | Wolfert | | |
| 5,174,798 A | 12/1992 | Luby | | |
| 5,205,279 A | 4/1993 | Brown | | |
| 5,316,569 A * | 5/1994 | Heunermund | ............ | 96/134 |
| 5,472,466 A | 12/1995 | Oler | | |
| 5,512,073 A | 4/1996 | Mirza | | |
| 5,530,971 A | 7/1996 | Anderson | | |
| 5,846,274 A | 12/1998 | Smelser | | |
| 5,891,223 A | 4/1999 | Shaw | | |
| 6,249,919 B1 | 6/2001 | Bryson, Jr. | | |
| 6,299,528 B1 | 10/2001 | Hansen | | |
| 6,395,068 B1 * | 5/2002 | Rooney | ............ | 95/90 |
| 6,482,084 B2 | 11/2002 | Hansen | | |
| 6,491,581 B1 | 12/2002 | Mankowski | | |
| 6,528,021 B1 | 3/2003 | Williams | | |
| 6,615,410 B1 | 9/2003 | Gurrola | | |
| 6,701,538 B2 | 3/2004 | Hunnicutt, Jr. | | |
| 6,799,600 B2 | 10/2004 | O'Neal | | |

(Continued)

*Primary Examiner* — Frank Lawrence, Jr.
(74) *Attorney, Agent, or Firm* — Gearhart Law, LLC

(57) ABSTRACT

The objective of the unit 10 is mainly to adsorb Hydrogen Sulfide gas (also known as H2S) and other gases including but not limited to Carbon Dioxide 26 from plumbing, sewer, and wastewater management system vents 21 thereby removing the odor and or greenhouse gasses associated with the air stream/gas 26. The unique "T" housing 12 shaped design, along with the unique perforated disc containment system 14 holds the filtration media 16 in the horizontal portion 120 of the "T" housing 12. configuration allows fresh air circulation 28 to blend with the odorous gasses 26 passing through the filtration media 16 within the containment chamber and reduces their concentration (PPM) thereby increasing the life of the unit 10. Having the inlet to the filtration media at the base of the vertical portion of the "T" 120 and two outlets at the distal ends 119 of equal or greater size and diameter as each other or as the inlet, also reduces Pressure drop across the media 16. The disc within the containment system 14 eliminates the need for a Media bag or cartridge reducing maintenance costs.

13 Claims, 4 Drawing Sheets

U.S. PATENT DOCUMENTS

| | | |
|---|---|---|
| 6,948,192 B2 | 9/2005 | Hipponsteel |
| 6,981,916 B2 | 1/2006 | Coulton |
| 2001/0014983 A1 | 8/2001 | Bryson, Jr. |
| 2002/0016150 A1 | 2/2002 | Hansen |
| 2003/0077999 A1 | 4/2003 | Mankowski |
| 2005/0015869 A1 | 1/2005 | Boeckler |
| 2006/0016339 A1 | 1/2006 | Mirza |
| 2007/0199948 A1* | 8/2007 | Ericson .................. 220/747 |

* cited by examiner

US 8,273,162 B2

WASTEWATER PLUMBING VENT GAS ADSORPTION FILTER

CROSS REFERENCE

This application is a continuation in part of U.S. patent application Ser. No. 12/348,296 filed on Jan. 4, 2009, now abandoned, the contents of which are fully incorporated herein by reference.

FIELD OF THE INVENTION

The invention relates to a vent and odorous gas filtration technology.

BACKGROUND OF THE INVENTION

The present invention relates to a system for removing offensive odors and neutralizing greenhouse gases that are into the atmosphere as byproducts of natural metabolic activity as well as through commercial chemical and biological processes. The system embodied in the present invention is a significant improvement over the prior art. The prior art primarily focused on channeling odorous and greenhouse gasses away from human habitation and released them in the atmosphere. However, without proper filtration, the released gasses tended to sink or drift back through the force of gravity or the direction of the wind. Additionally, ample studies have shown that greenhouse gases and other undesirable pollutants negatively impact the environment and the air that life forms inhale.

Filtration systems that exist suffer from numerous problems. For example, prior art devices do not adequately address the moisture buildup in typical filtration system. The filters also tend to be expensive, difficult to maintain and are not particularly long-lasting due to a highly corrosive environment. Also filtration systems tend to be intricate and costly, which relegates the technology to only the few who are obligated or are able to afford the cost. On the contrary, the present invention deals with all of these issues in an efficient and cost effective manner, making the present invention accessible to everyone, such as owners of small businesses, homeowners, and leisure water craft owners.

SUMMARY OF THE INVENTION

The invention discloses an air adsorbing filter device 10 for neutralizing odorous or greenhouse gases that are byproducts of plumbing, sewage and exhaust systems. An air adsorber or filter also called an air scrubber or a Bio Filter represented by the device 10 that mounts inline 12a or atop 12 of a building structure's sewer system, Boat waste water vents or waste water management lift station/sewer line vents which is designed to adsorb escaping gasses thereby removing any odors and greenhouse gases that are emitted from those gasses including but not limited to Hydrogen Sulfide, Carbon Dioxide, and Methane. The unique "T" shape design of the "T" housing 12 allows fresh air to blend with the odorous gasses passing through the filtration media 16 within the containment system which in combination reduce the concentration (Parts Per Million or PPM) of odorous gasses 26 thereby greatly increasing the life of the unit and the quality of the exiting air mixture 30.

The overall invention of an air adsorber or filter also called an air scrubber or bio filter that mounts atop or inline a sewer system, septic system, or plumbing system vent and greatly reduces odorous gasses and greenhouse gases that exit the vent. The main objective of the invention 10 is to adsorb Hydrogen Sulfide gas also known as H2S and other gases including but not limited to Carbon Dioxide and Methane from plumbing, sewer, and wastewater vents. The "T" shaped design allows fresh air to pass through the filtration media 16 and blends with gasses 26 to reduce their concentration (parts per million or PPM) thereby greatly increasing the life of the unit. The "T" shaped unit also acts as a rain cap and with its fresh airflow helps to control moisture in cold climates and it aids in natural regeneration of the filtration media 16. There are two options or alternatives of the invention, although other alternatives may also be possible. The first option is a typical inline venting system which is installed inline on the vent and contains the filtration media 16 within the main body 12a by two perforated discs 14 one at the top and one at the bottom of the inline filter. The second option is a "T" design which allows for fresh air 28 to pass through and mix with the filtration media 16 and the venting gasses 26. The filtration media 16 is held in place by 3 perforated discs 14 one at each end of the "T" and one at the inlet of the "T". The number of discs 14 is not definitive, and there may be additional or fewer discs 14 in other embodiments. This design acts as a rain cap and also helps dissipate moisture buildup in cold climates. 12:

Therefore, the present invention succeeds in conferring the following, and others not mentioned, desirable and useful benefits and objectives.

It is an object of the present invention to provide air adsorber.

It is another object of the present invention to provide an air scrubber, filter or bio filter capable of reducing odorous and greenhouse gasses emissions.

Yet another object of the present invention is to provide a rain cap for a plumbing vent.

Still another object of the present invention is to provide for a filter capable of extended life and low maintenance costs.

Still another object of the present invention is to prevents capable of wicking or channeling away moisture buildup in a vent.

Yet another object of the present invention is to provide a filtration media that is retained within its space with the assistance of a containing means.

Still another object of the present invention is to provide a filter housing that is capable of channeling fresh air into the adsorbing filter for a more effective reduction of odorous and greenhouse gases and to prolong the operational life of such a filter.

DESCRIPTION OF THE PREFERRED EMBODIMENTS

Figure 1:
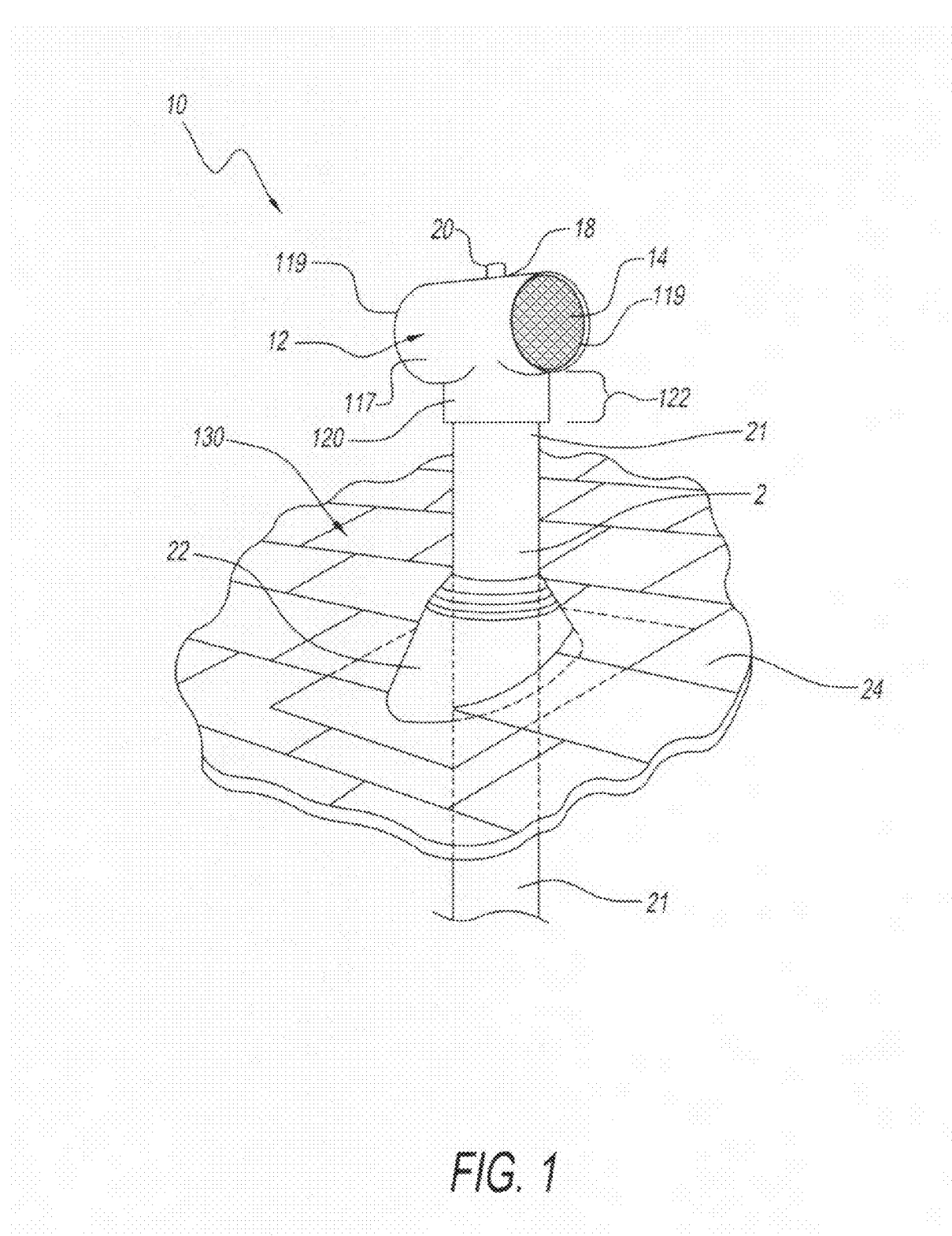
FIG. 1: is a perspective view of the invention 10 shown in use.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIGS. 1 through 4 represent the most common and preferred embodiment of the present invention. However, other embodiments are also possible, such as a wastewater treatment, a boat or a ships plumbing, ventilation or exhaust systems or any other ventilation and exhaust applications. These alternative embodiments may require some modification to the present invention that would not deviate from the present invention, that is, a filtration system capable of adsorbing odorous gasses. It follows, that the present invention may be adapted to all processes generating odorous or greenhouse gasses.

The two housing types. 12 and 12A (FIG. 2) serve as the main body types of the unit 10, although other body types or housing types are possible. The preferred material for construction of the inventions housing 10 is schedule 40 PVC (Poly Vinyl Chloride). However, any other forms of Plastic, Plastic composite, Resin, Resin composite metal or metal alloy may be utilized in any combination to create the housing 10 containing the filtration media 16. Another described embodiment is preferably cylindrical in shape and referred to as the "inline" design 12a (FIG. 3). It is unique as if allows the use of vent pipe odor absorbers in those applications where a vent top unit is not feasible.

FIG. 1 shows a preferred embodiment of the present invention, disposed as a rooftop housing 12, preferably made from PVC plastic. Other materials for manufacturing any of the components of the present invention may be metal foils, plastic foils, or composite foils. Other useful materials from which to manufacture any of the components of this invention include one or more plastics and resins, including but not limited to plastic, rubber, foam, silicone, ABS, Polycarbonate, Noryl™, PVC, Polystyrene, ABS/PVC, PVC/Acrylic, Polysulfone, Acrylic, Polyethylene, Kydex™, PETG; glass, including but not limited to fiberglass, borosilicate, or quartz; wood; metals, including but not limited to iron, tin, aluminum, copper; rubber including but not limited to natural rubber, SBR, Isoprene rubber, Butadiene rubber, and Chloroprene rubber; or any combinations or composites of these materials or other materials and new materials that may be manufactured in the future. Also shown in FIG. 1 are a scrubber device 10, a plumbing vent system 21, having a pipe 2, a weather boot 22; a horizontal portion 117, a vertical portion 120, distal ends 119, perforated disks 14, a rooftop 130, roofing material 24, a drain plug 18, and an indicator 20. Also shown in both FIGS. 1 and 2 are a weather boot 22 to weatherproof and secure pipes passing through a building's roof 23, and a typical roofing material 24.

The preferred shape of a rooftop housing 12 is in the form of a "T" (sized to fit vent pipe). The rooftop housing 12 or "T" housing may additionally describe housing appearing outside any structure such as an external bot exhaust or a septic tank exhaust system. The "T" housing 12 may also be referred to as the first housing 12, where a scrubbing system contains another scrubber device 10, such as an inline scrubber 12a (FIG. 3). One or more first housings 12 or one or more inline housings may be connected in line or in tandem on a scrubber system. The rooftop housing 12 may also be formed into other shapes, such as, but not limited to an upside down "L", a Greek Gamma, a curved pipe, or an arching pipe or any combinations or permutations of these shapes.

Either the vertical portion 117 or the horizontal portion 120 of the rooftop housing 12, which is also known as the "T" housing, or the inline housing 12a may be sized to fit a conventional pipe 2 of a plumbing vent system 21, or a similarly shaped chimney vent pipe (not shown). The perforated disk 14 may be in shape of a net or a fine wire mesh or a porous material, such as natural or artificial fabric, Styrofoam, or any other type of porous foam. It may also be a thin plate of any shape having perforations as discussed below. The perforated disk 14 may refer to a parallelogram object or a thin plate of any shape.

Figure 2:
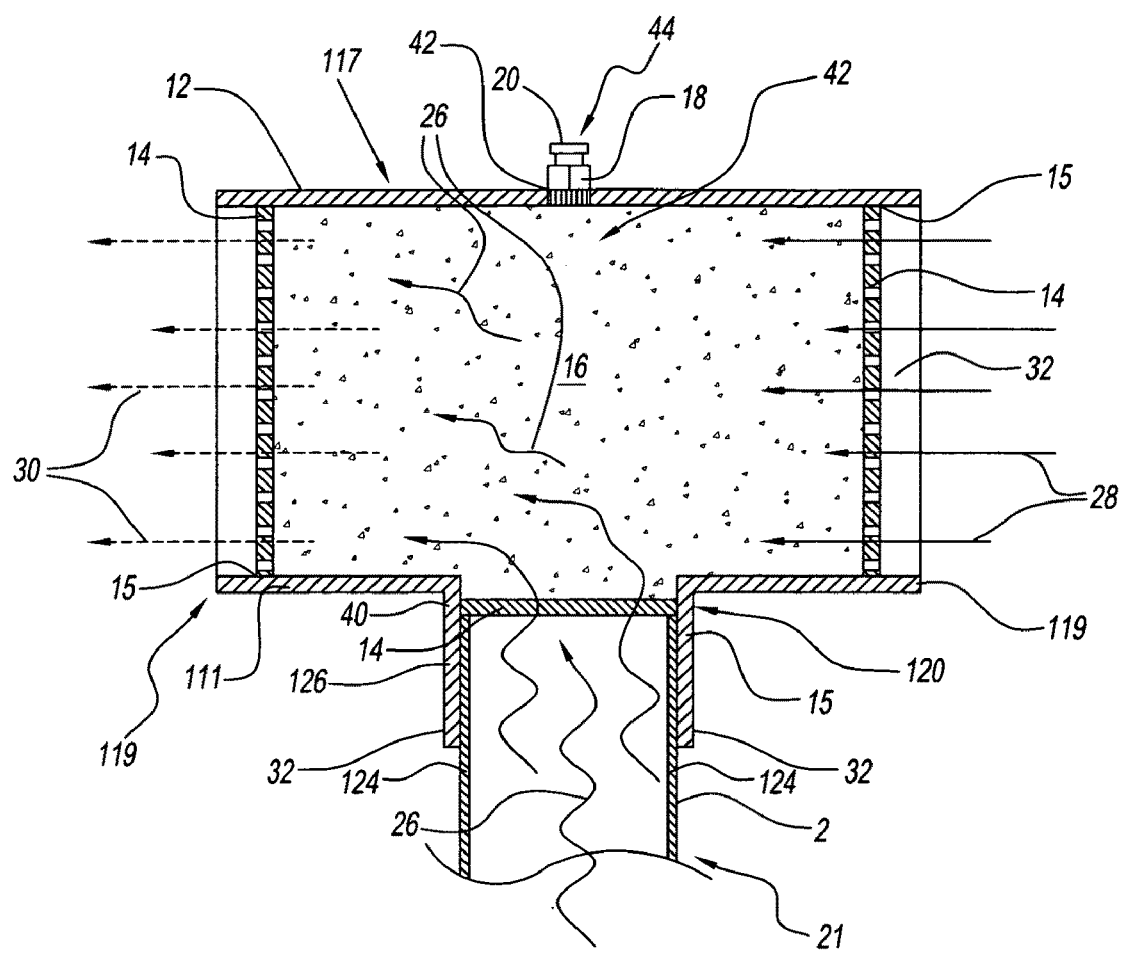
FIG. 2: is a cross section view of the invention 10.
Figure 3:
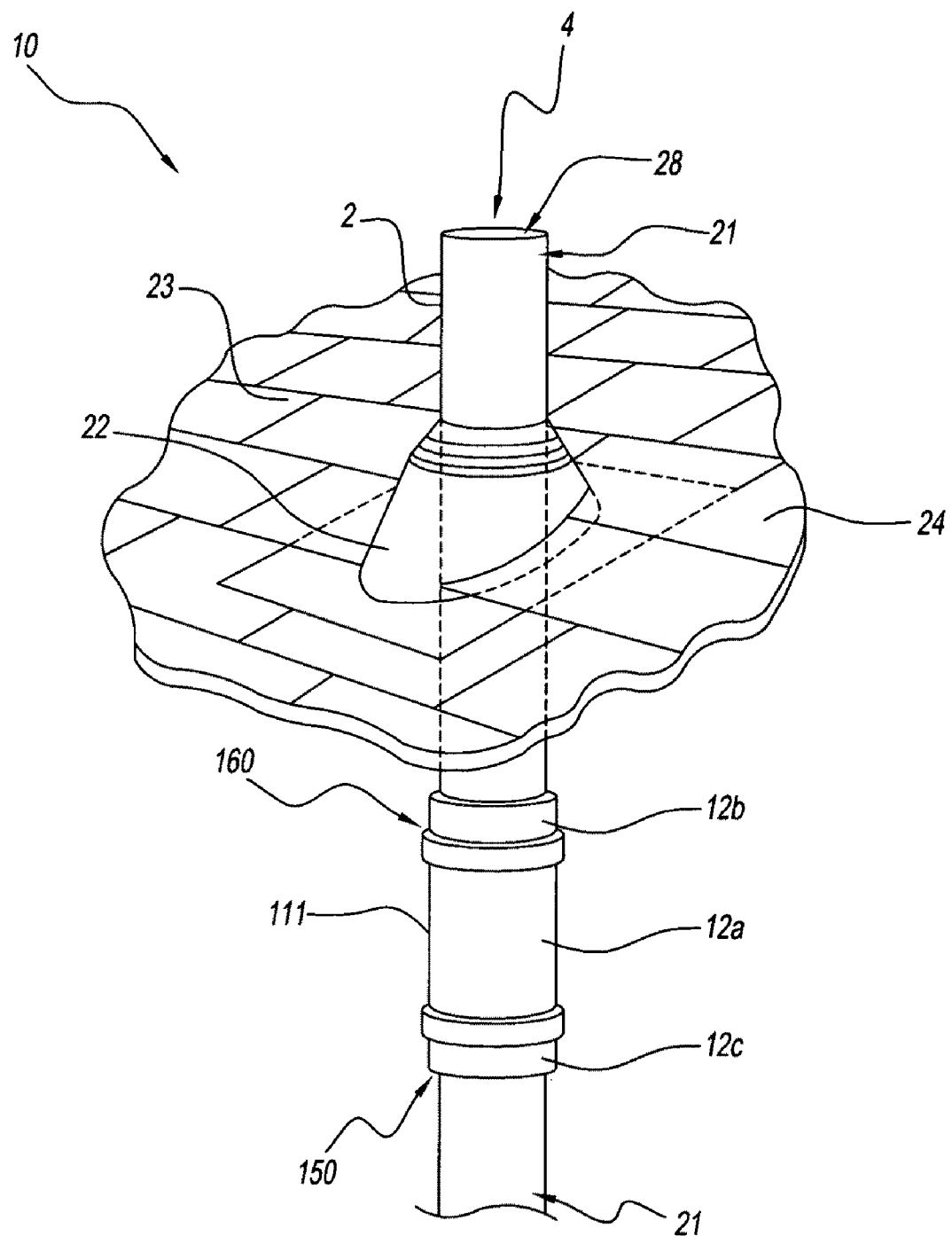
FIG. 3: is a perspective view of an alternate embodiment of invention 10 shown in use.

Referring now to FIG. 2, shown is a cross section cutaway of the "T" shaped housing 12. The parts illustrate are a sidewall 111, of a rooftop housing 12, plumbing vent system 21, a pipe 2, a horizontal portion 117, a vertical portion 120, distal ends 119, perforated disks 14, a drain plug 18, and an indicator 20, a filtration media 16, perforated discs 14, attachment point 15, a flow of gas 26, a flow of fresh air circulation 28, a combination flow 30, a weather shield extension 32, and mount flaps 34.

Perforated Discs 14—Are preferably made of ⅛ inch thick gray PVC sheet stock with 3/32 inch holes spaced every 5/32 of an inch. However The discs 14 may be manufactured from any form of plastic, Plastic composite, Resin, Resin composite metal, metal alloy or any combination thereof and the spacing and size of the perforated holes may vary to accommodate various forms of media 16 and air flow. Each disc 14 may be cut to a round shape or another shape, of varied size to accommodate the opening of the different sized filter housings 12,12a however the shape of the disc can vary to accommodate any shape needed to fit the filter housing openings of components 12,12a, such as inlet within a vertical portion 120 or outlet or distal ends 119. These discs 14 may be ultra sonic welded, thermal welded, chemically boded, press fit or can be molded as a single unit with the main filter housing as needed into each opening of the housing 12 or 12a. It is preferred that at least three disks 14 are used in the "T" housing 12 design and at least two disks 14 are used in the cylindrical, inline design 12a. The perforated discs 14 may also be an integral part of the housing 12,12a mold eliminating the need to cut and install the discs 14. The discs 14 help contain the filtration media or media bed 16 within the housing 12 or 12a, and the perforations allow the vent gasses 26 to pass through the housing 12,12a (top to bottom), over the contained media bed 16. In the case of the "T" 12 housing design, the discs 14 also allow fresh air circulation 28 to circulate through the housing 12 (side to side) to wick away moisture, dilute the odorous gas 26 reducing the concentration (PPM) and carry away the scrubbed gasses 30, constituting a mixture of the a scrubbed gas 26 and fresh air circulation 28.

The perforated discs 14 represent a key component of containment system of the present invention or a perforated disc containment system that is used to contain the filtration media 16 within the housings 12 or 12a. These perforated discs 14 are typically made from preferably ⅛" to ¼" thick PVC sheet stock, with between 3/32" and 3/64" diameter holes, that are spaced between every 5/32" and 5/64". The perforated discs 14 are cut to a round shape to accommodate the opening of the housings 12 and 12a. The discs may also be square or be shaped into any other polygonal shape, and may also be made from any metal, a metal alloy, a polymer, plastic, fiberglass or any future material or a composition material that may be suitable for this purpose. The discs 14 may be welded, bonded or molded into place 15, or may be integral or monolithic with the filtration media 16 or the rooftop or inline housing 12 or 12a. The discs 14 may also be attached into place 15 through means of ultra sonic welding, thermal welding, chemical bonding, press fit, molding or other suitable means. The disks 14 may be monolithic with the housings 12 or 12 *a*, or with the filtration media 16 or may be entirely removable.

The mount flap 34 may form the greater part of the vertical portion 120 and is at least 0.5 inches in length 122, with a diameter 124 that is equal to or greater than the diameter of a target vent pipe or conduit, so that when the rooftop housing 12 may mount onto pipe 2. Alternatively, the mount flap 34 may be welded to a lip of the pipe 2 or may be inserted into pipe 2. The connection may be preferably frictional, or may be welded, fastened, or crimped together.

The filtration media 16 may be made from different types of activated carbon or any suitable media to reduce odors and greenhouse gases. The filtration media 16 may otherwise be referred to as a filter or a media bed or any other combination of these terms, may also be composed of magnesium oxide, titanium dioxide, or zing oxide, or any combination thereof, or a combination with any other substance suitable for these purposes. The material used may preferably be granular in nature.

Still referring to FIG. 2, the filtration media 16 resides on the inner portion of the perforated disks 14. It is preferred that the filtration media 16 is located within the horizontal portion 117 of the rooftop housing 12, but may be located within the vertical portion 120. In an embodiment, where the rooftop housing 12 is inserted on top of a pipe 4, the outer lip of the pipe 40 preferably abuts the perforated disk 14 and is not in direct contact with the filtration media 16. Therefore the perforated disk 14 is preferably located substantially close to the horizontal section 117. Alternatively, the perforated disk 14 within a vertical section 120 may be installed at the bottom of the section, the top, or anywhere else along the length of the vertical section 120.

FIG. 2 illustrates the upwards flow of exhaust or greenhouse gasses 26, that are coming up from a sewer, wastewater, plumbing or any other type of exhaust system. Thus, the vertical portion 120, as shown, forms a bottom inlet of the "T" housing 12 for the gasses 26. These gases enter through the perforated disk 14 and engage the filtration media 16 within the vertical section 120 or within the horizontal section 130. The odorous substances of the exhaust air flow would then immediately begin the process of adsorption into the granular filtration media 16. To assist with the process of adsorption and to extend the life of the filtration media, a flow of fresh air is permitted to enter the rooftop housing 12 through at least one distal end 119, which, due to the flow of gas 26 and fresh air circulation 28, form the outlet sides of the housing 12. One way that the fresh air prolongs the life expectancy of the filter media 16, is that it induces a more uniform wear of the filtration media 16 by forcing the exhaust air flow 26 to spread throughout the filtration media 16, rather than stagnating within an area closest to the pipe 2. A mixture of filtered air 30 of treated exhaust gas 26 and air from the fresh air circulation 28 then exits one of the distal ends 11. In an alternative embodiment, the "T" housing or the rooftop housing 12 may need to be installed with horizontal portion 117 below the vertical portion 120. In this reverse configuration the distal ends 119 will form bottom inlet, while the vertical portion 120 will form the outer outlet.

Media Bed or filtration media 16 Can be a variety of adsorptive materials but is mainly an activated carbon specifically developed to adsorb odorous gasses 26. For removing greenhouse gasses, the activated carbon will typically be blended with an additional media 16. The adsorptive filtration media 16 can be achieved with a variety of materials but is mainly a granular combination of magnesium oxide, Titanium (IV) Dioxide, Zinc Oxide, Activated Carbon, or any combination thereof. The Activated Carbon or other media 16 can also be impregnated with a variety of chemicals to perform both functions of removing odorous gasses and greenhouse gasses.

Gasses 26 that normally vent through the vent pipe 21 and into the atmosphere pass through either the inline 12*a* or top mounted "T" 12 shape unit, through the perforated disc 14 on the inlet side of the adsorber (filter) unit 12, then pass through the media bed 16 (typically activated carbon) where the odorous gas 26 is adsorbed 26*b* thus removing any odors associated with the gas. Further, in the "T" 12*a* shaped design, fresh air 28 passes from side to side through the perforated discs 14 on the "outlet" sides, diluting 30 the odorous gasses 26 Reducing there PPM and also wicking away any moisture build up and carrying away the scrubbed gas 26*b*.

The device 10 works by intercepting gasses 26: from plumbing, sewer, and wastewater vents. The disks 14 and the filtration media 16 are designed to chemically attract, or adsorb bad odors and toxins from the gasses 26 and gradually turn the gas flow 26 into a filtered gas 26*a*, which would have greatly reduced levers of odorous and toxic substances. The filtration is then further enhanced by the presence of the fresh air circulation 28, which facilitates the adsorption process by diluting the concentration of the noxious gas content with fresh are. The combined flow of processed gas and fresh air is then emitted 30 into the atmospheres. The air flow 30: is a combination of fresh air and filtered gasses from plumbing, sewer and wastewater vents.

An air adsorber or filter also called an air scrubber 10 or a Bio Filter that mounts inline or atop building structure sewer system, using housings 12*a* and 12 respectively, boat waste water vents or waste water management, lift station/sewer line vents and is designed to adsorb escaping gasses thereby removing any odors and greenhouse gases that are emitted from those gasses including but not limited to Hydrogen Sulfide, Carbon Dioxide, and Methane. The unique "T" shape design allows fresh air 28 to blend with the odorous gasses 26 passing through the filtration media 16 within the housing 12 or 12*a*, also referred to as a containment chamber, which reduces their concentration (Parts Per Million or PPM) thereby greatly increasing the life of the unit. Although the "T" shape design may be preferred embodiment of the containment system 12 (FIG. 1), other embodiments are possible, such as, but not limited to an overturned "L" shape or a segment of duct, vent or pipe oriented at a diagonal at upper or lower couplings 12*b* and 12*c* (FIG. 3) or at the top coupling 12*d* (FIG. 2). Other orientations and shapes that block moisture and are capable of fresh air circulation are possible and are implied herein.

The horizontal portion 117 of the rooftop housing 12 may also act as a weather shield for the pipe 2 and the filtration media 16. The weather shield extensions 32, extend beyond the perforated disks 14 on the distal ends 119, to further guard the filtration media 16 from coming into contact with precipitation or other sources of moisture.

To monitor the operating life of the filtration media 16 the present invention includes a saturation indicator 20 that is installed inside drain plug 18. The saturation indicator 20 is utilized to detect contaminant breakthrough in the filtration media 16 that is also known as media bed. The saturation indicator 20 is preferably located on the outlet side 42 of the filtration media 16 and has an air inlet at the base 42 of the indicator 20 and an air outlet at the top of the top 44. Alternatively, the indicator 20 may be installed anywhere also within the present invention.

The top 44 is usually visible in form of a clear tube, so that a change of color or state of a saturation media within an indicator 20 would be readily apparent. The air vents within the base 42 and top 44 allow a sample of the filtered air 30 to pass over a test media. The saturation media reacts with any organic contaminates such as Hydrogen sulfide in the air stream and turns color. The media is typically Potassium Permanganate, however the saturation media can be made of various materials to react with different air borne contaminates. The Potassium Permanganate or another material may preferably be a granular material with very log freezing point that can be installed in the clear portion of the saturation indicator alone or can be coated onto a piece of litmus paper to reduce the quantity of material needed. A reaction of the saturation media would indicate that the flow of the exhaust 26 is no longer optimally filtered due to malfunctioning or saturated filtration media 16. Alternatively, the saturation media may be connected to a solenoid that is designed to trigger a noise, communications, signaling or a light device to be triggered to signal an end of life for the filtration media 16. The plug 18 provides housing for the saturation indicator 20, which will notify the owner or manager of the vented structure when the filtration media 16 is nearing its life end.

The saturation indicator 20 is typically threaded into a sample port located on the outlet or top end 44 of the housing 12 or 12a. However, the saturation indicator can also be a molded part of the main filter housing 12 or 12a. Another location for the saturation indicator can be on the outlet perforated disc 14. Using the indicator 20, the status of the filtration media 16 may be visible upon inspection of the top end 44 or upon removal of the indicator 20 from within the plug 18. The notification may be more sophisticated, for example, a notice may be sent to the owner, manager or any manufacturers of the device, which would then be able to solicit the owner or manager with offers to replace the unit while the air scrubber device 10 may still be functional.

The "T" shape design of the preferred rooftop housing 12 acts as a built in rain cap to prevent rainwater from entering the plumbing vent system 21. It is unique as it also allows cross through ventilation to wick away moisture that typically builds up around plumbing vent openings and helps prevent what is known as "frost horing", where the precipitation freezes within the vents, leading to poor line flow and other plumbing problems. The "T" shape housing 12 with cross flow ventilation also allows fresh air circulation 28 to be blended with the odorous/greenhouse gasses 26 thus diluting the quantity (PPM) of odorous/greenhouse gasses 26 exposed to the filtration media 16. This blending of fresh air and odorous air 26a increases or prolongs the life expectancy of the media 16 and enables a smaller quantity of media 16 to perform at levels where a larger quantity would normally be required. This makes for a lower profile unit 10 and reduces operating costs.

Figure 4:
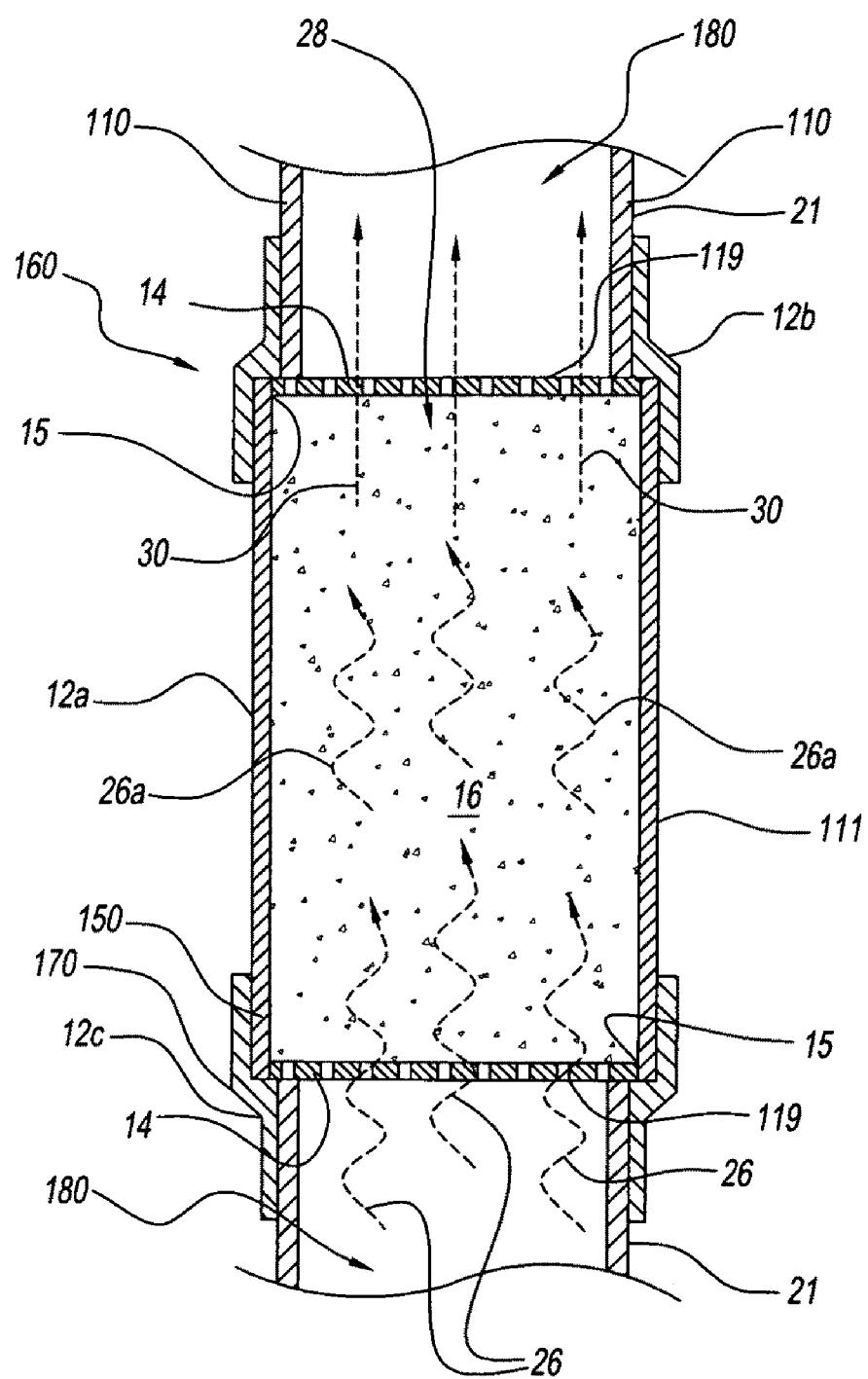
FIG. 4. is a cross section view of the alternate embodiment of invention 10.

FIGS. 3 and 4 illustrate another preferred embodiment of the present invention with an inline housing 12a. Alternatively, both the rooftop housing 12 and the inline housing 12 may be employed in line, one after the other, or in tandem for redundancy or failover. Also shown are a sidewall 111, an inline housing 12a, coupling 12b, and a lower coupling 12c, distal ends 119, a first outlet side 150, a second outlet side 160, a plumbing vent system 21, a pipe 2, a vertical portion 120, perforated disks 14, a filtration media 16 that is disposed between the first and second outlet sides 150 and 160, attachment point 15, and a flow of gas 26. In this embodiment, there may be a requirement to install a separate weather shield (not shown) to guard against weather buildup within the plumbing vent system 21, or the invention can be employed with tandem rooftop housing 12 that may or may not also contain the filtration media 16. Either the first or the second outlet sides 150 or 160 may function to inlet gas 26 or fresh air circulation 28 in a particular embodiment.

It is preferred that the inline housing 12a contains or has access to fresh air circulation 28. To this extent, it may be preferred to dispose the present invention inline housing 12a substantially close to the opening 4 of the pipe 2. Some of the air currents swirling above the opening 4 will trickle into the opening 4 and reach the filtration media 16 through either the first or second outlet sides 150 or 160, depending on the embodiment. The fresh air circulation 28 would then get pushed back by the upwards flow of the gas 26. In the process the fresh air circulation 28 would act to wick away of the moisture also aids in a natural regeneration of the filtration media 16. Throughout the application, wicking away refers to blowing away or transporting one substance with the help of another. For example, the fresh air circulation 28 serves to wick away moisture and odorous gases 26 from the filtration media 16.

The upper coupling 12b and a lower coupling 12c may preferably be attached to either distal end 119 of the inline housing 12a and also be referred to as left or a right coupling means respectively in a horizontal embodiment. The coupling may be achieved with an adhesive, welding, crimping soldering, fastening, or with an O-clamp (not shown). The couplings 12b and 12c may have threaded inside surfaces 170, with a corresponding thread on either or both the inline housing 12 and the pipe 2. The pipe 2 is usually cylindrical but may take on any other shape. FIG. 3 shows that the inline housing 12a is a containment system within a standard segment of a pipe 2 of a plumbing vent 21. Therefore, the present invention may be adapted to an exhaust system lacking an adsorption filter by removing a segment of a conventional vent pipe 2 and replacing it with the inline housing 12a. Alternatively, the inline housing 12a may be inserted directly into the internal cavity 180 of an exhaust or a venting conduit by removing a section of pipe's or a conduit's wall. In another alternative a section of an exhaust or a venting conduit may be prefabricated to contain an inline or rooftop housing 12a or 12, respectively. The couplings 12b and 12c they may be made of the same or different material than the inline housing 12a and sized to fit snugly around or within the vent pipe 2. The top connector 12d functions to secure the rooftop housing 12a or "T" shaped housing on the pipe 2.

The unit 10 may be structured in an "in-line"12a fashion so as to be placed "in-line" of the plumbing vent system 21 rather than just atop the vent pipe 2. The perforated disk 14 containment system allows greater flexibility in use for many different plumbing vent designs and applications. It may be built in different sizes to accommodate the many sizes of plumbing vent pipes 2 and volumes of escaping odorous gases 26 from plumbing vent systems 21. The unit 10 can be utilized for air filtration in applications other than plumbing and wastewater treatments. The unit 10 can be filled with many different types of activated carbon or other adsorbing media 16 that is designed to remove specific types of gases other than Hydrogen Sulfide.

The unit 10 achieves its objective by utilizing a "T" housing 12 shaped design with the inlet at the bottom of the vertical portion 120 of the unit 10. The filtration Media 16 is contained in the horizontal portion 117 of the "T" 12 with the perforated disc 14 containment system. Each distal end 119 of the Horizontal portion 117 of the "T" housing 12 is exposed to fresh air circulation 28 by admitting fresh air from the atmosphere surrounding the device 10. Containment of the Media 16 in this way allows fresh air 28 to encircle the Media 16 and blend with the odorous gasses 26 reducing the odorous gasses PPM thus increasing the odor control capabilities of the filtration media 16 and increasing the medias overall life expectancy. The fresh air circulation 28 through design of the unit 10 allows Moisture normally contained in vent system 21 to be wicked away from the media 16 eliminating a common vent problem in cold climates that is known in the art as "hore frosting" or "frost horing". Wicking away of the moisture also aids in a natural regeneration of the filtration media 16.

While the present invention has been described in terms of specific embodiments, it is to be understood that the invention is not limited to these disclosed embodiments. This invention may be embodied in many different forms and should not be construed as limited to the embodiments set forth herein; rather, these embodiments are provided by way of illustration only and so that this disclosure will be thorough, complete and will fully convey the full scope of the invention to those skilled in the art. Indeed, many modifications and other embodiments of the invention will come to mind of those skilled in the art to which this invention pertains, and which are intended to be and are covered by both this disclosure, the drawings and the claims."

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. An air scrubber comprising:
    a "T" housing having a horizontal portion, a vertical portion, said vertical portion having a bottom inlet, and said horizontal portion having outlet sides;
    a filtration media disposed within said horizontal portion of said "T" housing, said filtration media capable of being contained within a perforated disk containment system having a perforated disk;
    an inline housing, said inline housing disposed below said T housing, and said inline housing also having said filtration media;
    said outlet sides of said horizontal portion having said containment system, and said outlet sides being exposed to a fresh air circulation;
    said containment system and said filtration media being capable of reducing a parts per million concentration odorous gas by diluting said odorous gas concentration with said fresh air circulation;
    said fresh air capable of wicking away moisture from the filtration media; and
    said fresh air circulation capable of a natural regeneration of the filtration media.

2. The air scrubber of claim 1, wherein said perforated disk is ⅛ inch thick, said perforated disk having holes 3/32 of an inch in diameter, and said holes spaced 5/32 of an inch apart from each other.

3. The air scrubber of claim 1, wherein said filtration media is selected from a group consisting of magnesium oxide, titanium dioxide, activated carbon, zinc oxide, and any combination thereof.

4. The air scrubber of claim 1, wherein said filtration media is capable of adsorbing an odorous gas.

5. An air scrubber system comprising;
    an inline housing having a first outlet side and a second outlet side, said inline housing being disposed within a segment of a plumbing vent;
    a filtration media, said filtration media disposed within said inline housing, and said filtration media disposed between said first outlet side and said second outlet side;
    a "T" housing, said "T" housing disposed after said inline housing, said "T" housing having a horizontal portion and a vertical portion, and said T housing having at least one outlet side and a bottom inlet side;
    a perforated disk containment system disposed on said first outlet side or said second outlet side of said inline housing;
    said filtration media capable of diluting a gas concentration with a fresh air circulation; and
    a fresh air circulation capable of wicking away moisture from said filtration media.

6. The air scrubber system of claim 5, wherein said filtration media is disposed within said inline housing and said "T" housing.

7. The air scrubber system of claim 5, further compositing at least two inline housings.

8. The air scrubber system of claim 5, wherein said filtration media is selected from a group consisting of magnesium oxide, titanium dioxide, activated carbon, zinc oxide, and any combination thereof.

9. The air scrubber system of claim 5, wherein said filtration media is capable of adsorbing an odorous gas.

10. An air scrubbing system comprising,
    a first housing having a horizontal portion and a vertical portion, said vertical portion having at least one inlet, said horizontal portion having at least one outlet side;
    an inline housing having a first outlet and a second outlet;
    a filtration media disposed within said first housing or within said inline housing;
    said inline housing disposed before said first housing;
    said inline housing and said first housing being disposed within a venting system;
    a perforated disk containment system, said perforated disk containment system disposed at said inlet, said outlet side, said first outlet and said second outlet;
    said air scrubbing system being capable of a fresh air circulation within said first housing or said inline housing, said fresh air circulation being capable of diluting a gas concentration; and
    said fresh air circulation being capable of wicking away moisture from said air scrubbing system.

11. The air scrubbing system of claim 10, wherein said containment system further comprises at least one perforated disk.

12. The air scrubbing system of claim 10, further comprising at least two inline housings.

13. The air scrubbing system of claim 10, wherein said filtration media is selected from a group consisting of magnesium oxide, titanium dioxide, activated carbon, zinc oxide, and any combination thereof, said filtration media being capable of adsorbing an odorous gas.

* * * * *